US012040544B2

(12) United States Patent
Luo et al.

(10) Patent No.: US 12,040,544 B2
(45) Date of Patent: Jul. 16, 2024

(54) COMMON APERTURE ANTENNA AND COMMUNICATION DEVICE

(71) Applicant: HUAWEI TECHNOLOGIES CO., LTD., Shenzhen (CN)

(72) Inventors: Bing Luo, Chengdu (CN); Wenfei Qin, Chengdu (CN); Jianping Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 119 days.

(21) Appl. No.: 17/721,501

(22) Filed: Apr. 15, 2022

(65) Prior Publication Data

US 2022/0239008 A1 Jul. 28, 2022

Related U.S. Application Data

(63) Continuation of application No. PCT/CN2020/120444, filed on Oct. 12, 2020.

(30) Foreign Application Priority Data

Oct. 18, 2019 (CN) ........................ 201910999336.6

(51) Int. Cl.

*H01Q 15/14* (2006.01)
*H01Q 21/06* (2006.01)
*H01Q 21/26* (2006.01)

(52) U.S. Cl.

CPC ........... *H01Q 15/14* (2013.01); *H01Q 21/062* (2013.01); *H01Q 21/26* (2013.01)

(58) Field of Classification Search

CPC ....... H01Q 15/14; H01Q 21/062; H01Q 21/26
See application file for complete search history.

(56) References Cited

U.S. PATENT DOCUMENTS 5,485,167 A * 1/1996 Wong ........................ H01Q 5/42 343/834
5,892,485 A * 4/1999 Glabe ................ H01Q 15/0013 343/756

(Continued)

FOREIGN PATENT DOCUMENTS

CN 105789891 A 7/2016
CN 104993249 B * 7/2017

(Continued)

OTHER PUBLICATIONS

Jin Xiong-jie et al., Design of an X/Ku Dual-Band Microstrip Dipole Antenna. Journal of Microwaves , 2018, 4 pages.

(Continued)

*Primary Examiner* — Ricardo I Magallanes
*Assistant Examiner* — Jordan E. DeWitt
(74) *Attorney, Agent, or Firm* — Rimon PC

(57) ABSTRACT

Embodiments of this application disclose a common aperture antenna and a communication device. The common aperture antenna includes: a reflection panel and a low frequency antenna unit, a frequency selective panel, and a high frequency antenna unit that are disposed on the same side as the reflection panel and are arranged in sequence. In the direction perpendicular to the reflection panel, the distance between the high frequency antenna unit and the reflection panel is greater than the distance between the low frequency antenna unit and the reflection panel, the frequency selective panel is disposed between the high frequency antenna unit and the low frequency antenna unit, and the frequency selective panel is a reflection ground of the high frequency antenna unit and has a total reflection characteristic for the working frequency of the high frequency antenna unit.

20 Claims, 7 Drawing Sheets

(56) References Cited

U.S. PATENT DOCUMENTS

| | | | | |
|---|---|---|---|---|
| 8,212,739 | B2 * | 7/2012 | Sievenpiper | H01Q 15/0066<br>343/909 |
| 9,960,860 | B2 * | 5/2018 | Sim | H05K 9/0086 |
| 10,396,460 | B2 * | 8/2019 | Kosaka | H01Q 5/45 |
| 2005/0276286 | A1 * | 12/2005 | MacCormack | H01S 3/0675<br>372/13 |
| 2011/0133978 | A1 * | 6/2011 | Sim | H01Q 17/007<br>427/102 |
| 2013/0285858 | A1 * | 10/2013 | Grange | H01F 10/3218<br>343/700 MS |
| 2017/0346179 | A1 * | 11/2017 | Wu | H01Q 25/001 |
| 2018/0062262 | A1 | 3/2018 | Kasemodel et al. | |
| 2018/0090833 | A1 | 3/2018 | Kosaka | |
| 2018/0269577 | A1 | 9/2018 | Kosaka et al. | |
| 2019/0036226 | A1 * | 1/2019 | Ding | H01Q 19/108 |
| 2019/0296435 | A1 | 9/2019 | Wu et al. | |
| 2019/0305436 | A1 | 10/2019 | Legay et al. | |
| 2020/0006861 | A1 * | 1/2020 | Kasani | H01Q 19/108 |
| 2020/0099130 | A1 * | 3/2020 | Daojian | H01Q 1/48 |
| 2021/0194136 | A1 * | 6/2021 | Chen | H01Q 21/26 |
| 2021/0320409 | A1 * | 10/2021 | Luo | H01Q 21/30 |
| 2022/0239008 | A1 * | 7/2022 | Luo | H01Q 1/246 |
| 2023/0137645 | A1 * | 5/2023 | Shen | H01Q 21/24 |

FOREIGN PATENT DOCUMENTS

| | | | | | |
|---|---|---|---|---|---|
| CN | 107171065 | A | | 9/2017 | |
| CN | 107579347 | A | * | 1/2018 | |
| CN | 107579347 | A | | 1/2018 | |
| CN | 107834183 | A | | 3/2018 | |
| CN | 108173005 | A | | 6/2018 | |
| CN | 108199134 | A | | 6/2018 | |
| CN | 108258394 | A | | 7/2018 | |
| CN | 208674381 | U | | 3/2019 | |
| WO | 2015029383 | A1 | | 3/2015 | |
| WO | WO-2018064836 | A1 | * | 4/2018 | H01Q 15/0013 |

OTHER PUBLICATIONS

Han Zhou et al., Design of S/Ka dual-band shared-aperture Massive MIMO antenna array for 5G communication. 2019 13th European Conference on Antennas and Propagation (EuCAP), Jun. 20, 2019, 4 pages.

* cited by examiner

COMMON APERTURE ANTENNA AND COMMUNICATION DEVICE

CROSS-REFERENCE TO RELATED APPLICATIONS

This application is a continuation of International Application No. PCT/CN2020/120444, filed on Oct. 12, 2020, which claims priority to Chinese Patent Application No. 201910999336.6, filed on Oct. 18, 2019. The disclosures of the aforementioned applications are hereby incorporated by reference in their entireties.

TECHNICAL FIELD

This application relates to the field of wireless communication technologies, and in particular, to a common aperture antenna and a communication device.

BACKGROUND

In the design process of a dual-band or multi-band array antenna, a common aperture technology is usually used to arrange array antennas of two frequency bands or even a plurality of frequency bands on the same mouth surface, so that the size of the multi-band array antenna can be greatly reduced. This feature provides advantages of small-scale, lightweight, and easy deployment. However, in a common aperture antenna design, antenna units of different frequency bands need to be arranged closely to each other. In this case, because of the large size and height of a low frequency antenna, a high frequency antenna is severely blocked, and a radiation pattern is greatly affected.

SUMMARY

Embodiments of this application provide a common aperture antenna and a communication device, to solve the problem that a low frequency antenna blocks a high frequency antenna in a dual-band or multi-band array antenna.

According to a first aspect, in an implementation, an embodiment of this application provides a common aperture antenna. The common aperture antenna includes: a reflection panel and a low frequency antenna unit, a frequency selective panel, and a high frequency antenna unit that are disposed on the same side as the reflection panel and that are arranged in sequence, where in the direction perpendicular to the reflection panel, the distance between the high frequency antenna unit and the reflection panel is greater than the distance between the low frequency antenna unit and the reflection panel, the frequency selective panel is disposed between the high frequency antenna unit and the low frequency antenna unit, and the frequency selective panel is a reflection ground of the high frequency antenna unit and has the total reflection characteristic for the working frequency of the high frequency antenna unit. In the solution in this embodiment, the high frequency antenna unit is disposed at a larger distance to the reflection panel than the low frequency antenna unit does, the frequency selective panel is disposed between the high frequency antenna unit and the low frequency antenna unit, and the frequency selective panel is used as an alternative reflection panel of the high frequency antenna unit, so that the distance between the high frequency antenna unit and its reflective surface is reduced. Therefore, the problem that the radiation pattern of the high frequency antenna unit is distorted due to an excessively large distance between the high frequency antenna unit and the reflection panel and the working bandwidth becomes narrow is avoided.

In an implementation, the transmittance of the frequency selective panel for high frequency signal is not greater than 10%. When the transmittance of the frequency selective panel for the high frequency signal is not greater than 10%, total reflection may be performed on the high frequency signal, so that the frequency selective panel serves as a reflection panel.

In an implementation, the frequency selective panel has a partial reflection characteristic for a low frequency signal. By using the partial reflection characteristic of the frequency selective panel, the signal radiated by the low frequency antenna unit is reflected back, and the signal reflected back by the frequency selective panel is counteracted with the reflected signal of the low frequency antenna unit, thereby loading the low frequency antenna unit, enhancing radiation performance and the working bandwidth of the low frequency antenna unit, further reducing the height of the low frequency antenna unit, and miniaturizing the common aperture antenna.

In an implementation, the transmittance range of the frequency selective panel for a low frequency signal is 20% to 80%. When a transmittance of the frequency selective panel for the low frequency signal ranges from 20% to 80% (including endpoints), the signal radiated by the low frequency antenna unit can be effectively reflected back, so that the reflected signal is counteracted with the reflected signal of the low frequency antenna unit, thereby loading the low frequency antenna unit. If the transmittance is less than 20%, the reflectance is too high. Consequently, the signal reflected back by the frequency selective panel is far stronger than the reflected signal of the low frequency antenna unit, and the two signals cannot be well counteracted with each other. If the transmittance is greater than 80%, the reflectance is too low. Consequently, the signal reflected back by the frequency selective panel is far weaker than the reflected signal of the low frequency antenna unit, and the two signals cannot be well counteracted with each other.

In an implementation, the frequency selective panel is disposed in parallel to the reflection panel, a vacuum wavelength corresponding to the working frequency of the low frequency antenna unit is λ, and the distance between the high frequency antenna unit and the low frequency antenna unit in the direction perpendicular to the reflection panel is less than or equal to 0.5λ. When the distance between the high frequency antenna unit and the low frequency antenna unit in the direction perpendicular to the reflection panel is less than or equal to 0.5λ, the distance between antenna units can become shorter, thereby reducing the array size and miniaturizing the antenna.

In an implementation, the distance between the low frequency antenna unit and the frequency selective panel in the direction perpendicular to the reflection panel is less than or equal to 0.1λ. When the vertical distance between the low frequency antenna unit and the frequency selective panel is less than or equal to 0.1λ, the frequency selective panel can achieve a maximum phase reversal of 72 degrees (0.2*360) for the reflected signal reflected by the frequency selective panel. This facilitates reversal of the reflected signal, and the reflected signal is counteracted with the reflected signal of the low frequency antenna unit, thereby improving the radiation performance of the low frequency antenna unit.

In an implementation, there are a plurality of high frequency antenna units, and the plurality of high frequency antenna units are distributed in a form of an array. The common aperture antenna further includes a plurality of first feeding units and a second feeding unit, the plurality of first feeding units respectively feed the plurality of high frequency antenna units, the second feeding unit feeds the low frequency antenna unit, the low frequency antenna unit includes at least one radiation arm, the radiation arm forms a hollow-out area, and a part of the first feeding unit passes through the hollow-out area and extends to electrically connect to the high frequency antenna unit. In this implementation, the first feeding unit is disposed to pass through the hollow-out area of the low frequency antenna unit. This helps to reduce the distance between the high frequency antenna unit and the low frequency antenna unit and miniaturize the common aperture antenna.

In an implementation, the reflection panel includes a top surface and a bottom surface. The low frequency antenna unit is located on the side of the top surface of the reflection panel. The first feeding unit passes through the reflection panel from the side of the bottom surface of the reflection panel and extends to electrically connect to the high frequency antenna unit to feed the high frequency antenna unit. The second feeding unit passes through the reflection panel from the side of the bottom surface of the reflection panel and extends to electrically connect to the low frequency antenna unit to feed the low frequency antenna unit. The low frequency antenna unit and the high frequency antenna unit are fixedly connected to the reflection panel by using the first feeding unit and the second feeding unit, to ensure a positional relationship between the low frequency antenna unit and the high frequency antenna unit.

In an implementation, the high frequency antenna units are distributed in the form of an array on a first plane, and the first plane is parallel to the frequency selective panel. The first plane on which the high frequency antenna unit is located is disposed in parallel to the frequency selective panel to ensure consistency of radiation performance of all high frequency antenna units and help miniaturize an entire architecture of the antenna.

In an implementation, the low frequency antenna unit includes a first group of dipole units and a second group of dipole units, the first group of dipole units and the second group of dipole units each include two radiation arms, the four radiation arms are distributed in a form of a 2×2 array architecture, and the two radiation arms of the first group of dipole units and the two radiation arms of the second group of dipole units are respectively located at opposite corners of the array architecture. In this embodiment, the low frequency antenna unit uses a bilinear polarized dipole unit, to enhance the radiation performance when being loaded on the frequency selective surface.

In an implementation, the radiation arm is a hollow-out annular structure. In a vertical projection of each radiation arm on the reflection panel, a projection area corresponding to the hollow-out area formed the radiation arm is an inner-arm area, and the first feeding unit passing through the inner-arm area extends toward the low frequency antenna unit and passes through the hollow-out area. Because the height of the low frequency antenna unit in the direction perpendicular to the reflection panel is lower than that of the high frequency antenna unit and the size of the low frequency antenna unit is larger than that of the high frequency antenna unit, to facilitate an array layout of the low frequency antenna unit and the high frequency antenna unit, a radiation arm of the low frequency antenna unit is designed as a hollow-out structure, so that the first feeding unit of the high frequency antenna unit can pass through the hollow-out area of the radiation arm to connect to the high frequency antenna unit.

In an implementation, the second feeding unit includes: a first feeder, a second feeder, and four printed circuit boards in a one-to-one correspondence with the radiation arms, the printed circuit boards are connected between the radiation arms and the reflection panel, each printed circuit board includes a ground panel, a signal cable, and a feeding welding plate, two of the printed circuit boards are first boards, the first boards are connected to the radiation arms of the first dipole units, the other two printed circuit boards are second boards, the second boards are connected to the radiation arms of the second dipole units, there is a first gap between the two first boards, signal cables on the two first boards are connected across the first gap, there is a second gap between the two second boards, signal cables on the two second boards are connected across the second gap, each radiation arm is electrically connected to the ground panel through the feeding welding plate, an external conductor of the first feeder is electrically connected to the ground panel of one of the first boards, an inner conductor of the first feeder is electrically connected to the signal cable of the first board, an external conductor of the second feeder is electrically connected to the ground panel of one of the second boards, and an inner conductor of the second feeder is electrically connected to the signal cable of the second board. For the same group of dipole units, two printed circuit boards correspondingly connected to the same group of dipole units serve as a radiation arm and a reflection panel. In this case, the two printed circuit boards correspondingly connected to the same group of dipole units are connected to reverse a phase of an electromagnetic signal and load an electromagnetic signal in the low frequency antenna unit. In addition, the communication signal is transmitted to the low frequency antenna unit through an inner chip and a ground cable of the external conductor and the printed circuit boards. In this way, a signal of the low frequency antenna unit is transmitted.

In an implementation, the two first boards are coplanar, the two second boards are coplanar, and the direction in which the first boards extend is orthogonal to the direction in which the second boards extend. The coplanar first boards and the coplanar second boards help signal cables in the printed circuit boards stably transmit a signal to the low frequency antenna unit.

According to a second aspect, in an implementation, this application provides a communication device. The communication device includes a signal transceiver and the foregoing common aperture antenna, where the common aperture antenna is connected to the signal transceiver through a plurality of radio signal transceiver channels. Signals are transmitted between the signal transceiver and the common aperture antenna through the radio signal transceiver channels.

In the common aperture antenna provided in the embodiments of the present disclosure, the high frequency antenna unit is disposed on the side of the low frequency antenna unit far away from the reflection panel, and the frequency selective panel is disposed between the high frequency antenna unit and the low frequency antenna unit, to solve a problem that the low frequency antenna blocks the high frequency antenna in a dual-band or multi-band array antenna.

BRIEF DESCRIPTION OF DRAWINGS

To describe technical solutions in embodiments or the background of this application more clearly, the following describes the accompanying drawings used in embodiments or the background of this application.

DESCRIPTION OF EMBODIMENTS

The following describes embodiments of this application with reference to the accompanying drawings in the embodiments of this application.

Figure 1:
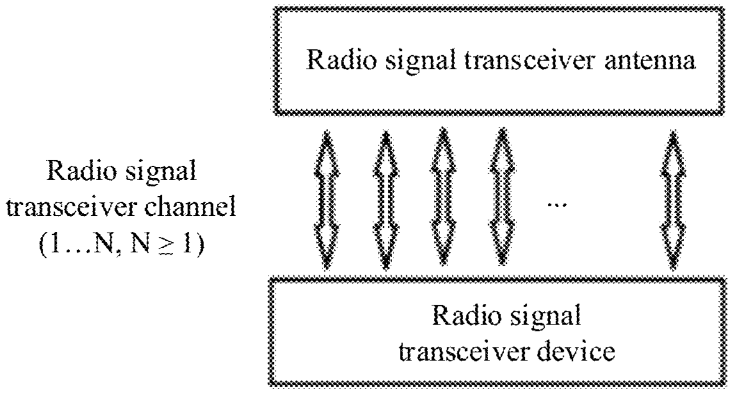
FIG. 1 is a principle diagram of signal transmission of a communication device.
Figure 2:
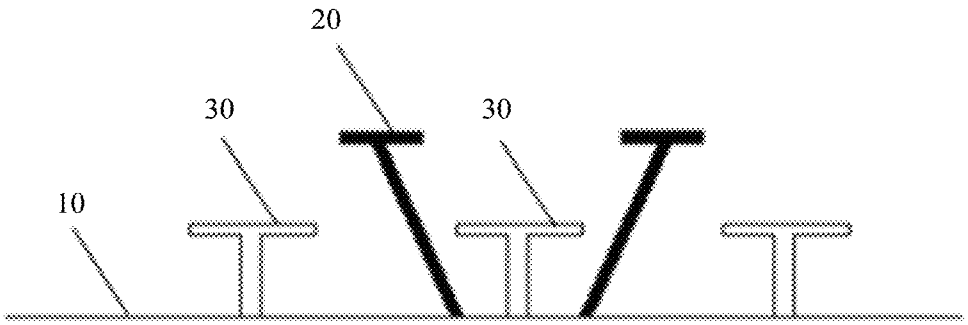
FIG. 2 is a schematic diagram of an array antenna according to a conventional technology.

With the advent of information age, communication devices propose higher requirements on information exchange. As shown in FIG. 1, a communication device includes a radio signal transceiver device and a radio signal transceiver antenna, which transmit signals between each other through a radio signal transceiver channel. The radio signal transceiver device may transmit a radio signal through the radio signal transceiver antenna, and may further receive an external radio signal through the radio signal transceiver antenna. As an important carrier of information transmission, the performance of wireless antenna determines an information transmission speed of the communication device. To meet diversified demands of information exchange, in actual antenna design and production, the common aperture technology is usually used to arrange array antennas of two frequency bands or even a plurality of frequency bands on the same mouth surface, so that the size of a multi-band array antenna can be greatly reduced. This feature provides advantages of small-scale and lightweight. However, as shown in FIG. 2, in a design of a common aperture antenna, the distance between an antenna radiator (a low frequency antenna unit 20 or a high frequency antenna unit 30) to a reflection panel 10 is ¼ wavelength of the respective working frequency. Because the working frequency of the low frequency antenna unit 20 is low and a corresponding wavelength is long, the vertical distance between the low frequency antenna unit 20 and the reflection panel 10 is large. On the contrary, the vertical distance between the high frequency antenna unit 30 and the reflection panel 10 is small.

Figure 3:
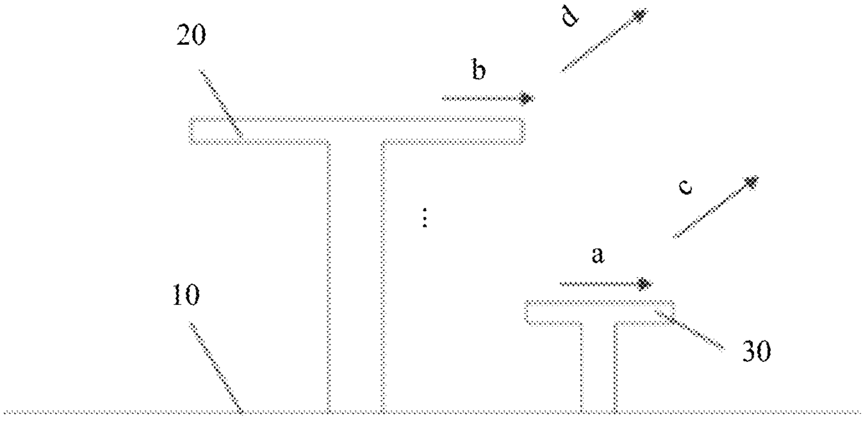
FIG. 3 is a principle diagram showing that second radiation occurs in an array antenna according to a conventional technology.

Although such a product determined by its physical characteristics can facilitate a common aperture design of a multi-band antenna, such a design also brings other problems. As shown in FIG. 3, in a design in which a low frequency antenna unit 20 is lower than a common aperture antenna above a high frequency antenna unit 30, antenna units of different frequency bands need to be arranged closely to each other. In this case, because of the large size and height of the low frequency antenna unit 20, the high frequency antenna unit 30 is severely blocked, and its radiation pattern is greatly affected. In FIG. 3, arrow a represents the direction of the main radiation current on the high frequency antenna unit 30. In this case, the main radiation current generates main radiation c. Arrow b represents the direction of the induced current generated by the low frequency antenna unit 20 due to the mutual coupling when the low frequency antenna unit 20 and the high frequency antenna unit 30 are close, and the induced current correspondingly generates an induced radiation d. The induced radiation d is superimposed on the main radiation c. Consequently, the direction pattern of the high frequency antenna unit 30 is distorted, and antenna performance is deteriorated. Therefore, how to prevent the low frequency antenna unit 20 from blocking the high frequency antenna unit 30 becomes a focus in designing the common aperture antenna.

Figure 4:
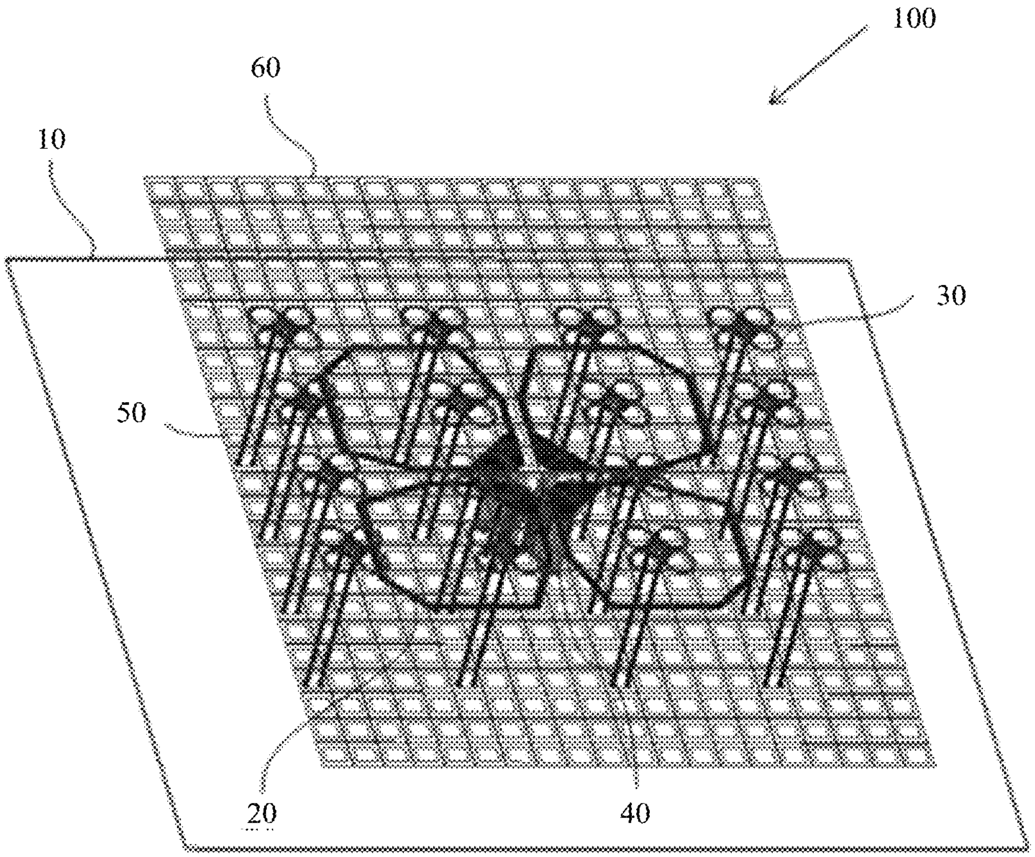
FIG. 4 is a schematic diagram of a structure of a common aperture antenna according to an implementation of this application.
Figure 5:
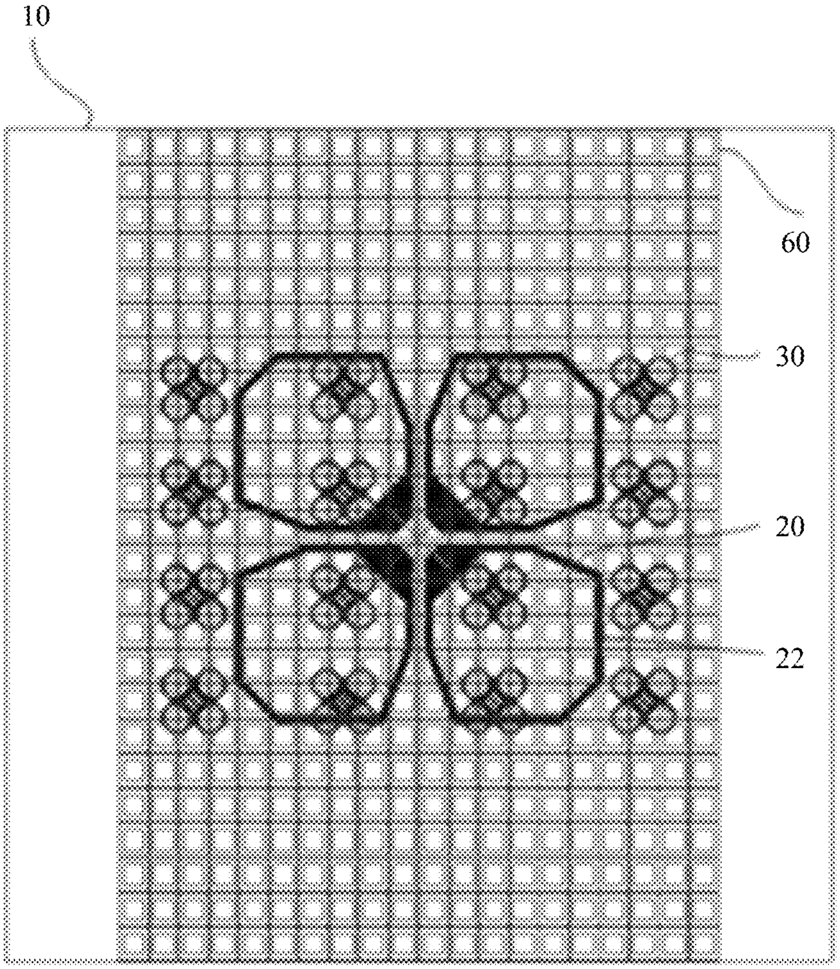
FIG. 5 is a top view of the common aperture antenna in FIG. 3.
Figure 6:
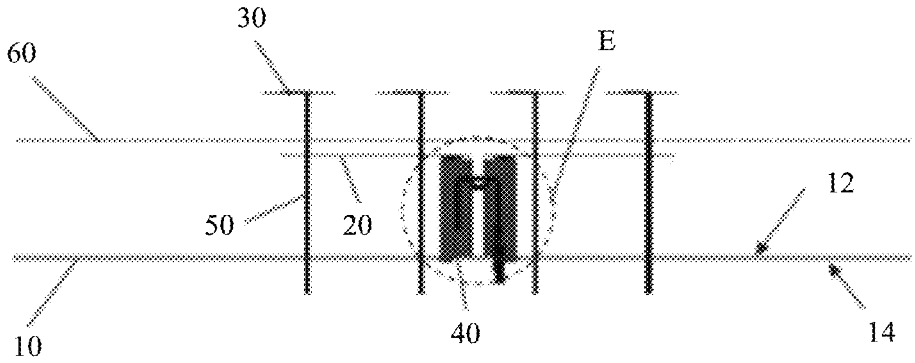
FIG. 6 is a main view of the common aperture antenna in FIG. 3.

In view of this, as shown in FIG. 4 to FIG. 6, this application provides a common aperture antenna 100, including a reflection panel 10 and a low frequency antenna unit 20, a high frequency antenna unit 30, and a frequency selective panel 60, namely, a frequency selective surface (FSS), that are disposed on a same side as the reflection panel 10 and that are arranged in sequence. In the direction perpendicular to the reflection panel 10, the distance between the high frequency antenna unit 30 and the reflection panel 10 is greater than the distance between the low frequency antenna unit 20 and the reflection panel 10, the frequency selective panel 60 is disposed between the high frequency antenna unit 30 and the low frequency antenna unit 20, and the frequency selective panel 60 is a reflection ground of the high frequency antenna unit 30 and has a total reflection characteristic for the working frequency of the high frequency antenna unit 30. In this embodiment, as shown in FIG. 6, the used technical solution is that the high frequency antenna unit 30 is disposed above the low frequency antenna unit 20, in other words, the distance between the high frequency antenna unit 30 and the reflection panel 10 is greater than the distance between the low frequency antenna unit 20 and the reflection panel 10. In this way, the low frequency antenna unit 20 can be prevented from blocking the high frequency antenna unit 30. However, if only upper and down positions of the high frequency antenna unit 30 and the low frequency antenna unit are switched, other problems arise. For example, the larger distance between the high frequency antenna unit 30 and the reflection panel 10 causes distortion of the direction pattern of the high frequency antenna unit and narrowing of the working bandwidth. In view of this, in this embodiment, the frequency selective panel 60 is further disposed between the high frequency antenna unit 30 and the low frequency antenna unit 20. The frequency selective panel 60 has a spatial filtering function. The frequency selective panels may be classified into four basic types based on passing and blocking characteristics of surfaces for different frequencies of electromagnetic waves: a high-pass type, a low-pass type, a band-pass type, a band-stop type. The frequency selective panel 60 in this embodiment has a band-stop characteristic for a high frequency signal, and a transmittance of the frequency selective panel 60 for the high frequency signal is below 10% (including 10%). In this case, the frequency selective panel 60 serves as the reflection panel 10 to reflect the high frequency signal, thereby avoiding distortion of the radiation pattern of the high frequency antenna unit 30 and narrowing of the bandwidth. Furthermore, the total reflection effect of the frequency selective panel 60 for the high frequency signal shows a band-stop characteristic for the working frequency of the high frequency antenna unit 30, so that the high frequency signal does not generate an induced current due to coupling to the low frequency antenna unit 20, thereby avoiding generating induced radiation, which affects main radiation of the high frequency antenna unit 30.

In the design in this embodiment, the high frequency antenna unit 30 is designed on the side of the low frequency antenna unit 20 far away from the reflection panel 60, and the frequency selective panel 60 impedance to a high frequency signal is disposed between the high frequency antenna unit 30 and the low frequency antenna unit 20. This prevents the low frequency antenna unit 20 from blocking the high frequency antenna unit, and furthermore, avoids distortion of the direction pattern caused by an excessively large distance between the high frequency antenna unit 30 and the reflection panel. In addition, the frequency selective panel 60 further blocks coupling of the high frequency signal to the low frequency antenna unit.

In one embodiment, as shown in FIG. 6, the transmittance of the frequency selective panel 60 for a low frequency signal ranges from 20% to 80%, and the frequency selective panel 60 has a partial reflection characteristic for the low frequency signal. The frequency selective panel 60 in this embodiment not only has a band-stop characteristic for the high frequency signal, but also has a partial reflection characteristic for the low frequency signal, in other words, the transmittance for the low frequency signal ranges from 20% to 80%. By properly designing the reflectance of the frequency selective panel 60 for the working frequency of the low frequency antenna unit 20, the frequency selective panel 60 reflects a signal transmitted by the low frequency antenna unit 20, and the signal reflected back by the frequency selective panel 60 is counteracted with the signal of the low frequency antenna unit 20, thereby loading the low frequency antenna unit 20, and enhancing radiation performance and the working bandwidth of the low frequency antenna unit 20. In one embodiment, to help load the low frequency antenna unit 20, the distance between the low frequency antenna unit 20 and the reflection panel 10 may be adjusted, to miniaturize the common aperture antenna.

Figure 10A:
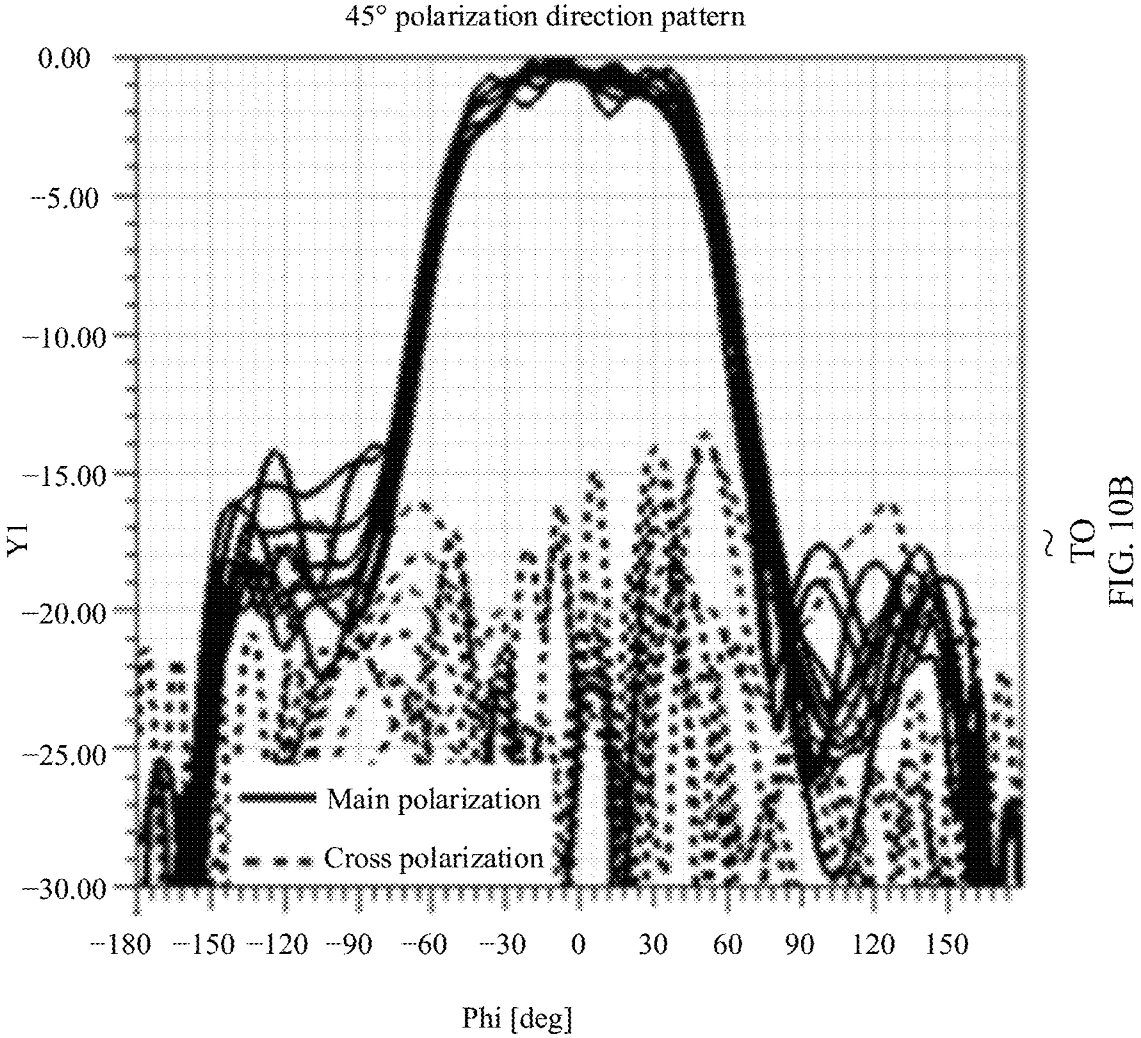
FIG. 10A and FIG. 10B are a direction pattern of a corresponding high frequency antenna unit in a common aperture antenna according to an embodiment.
Figure 10B:
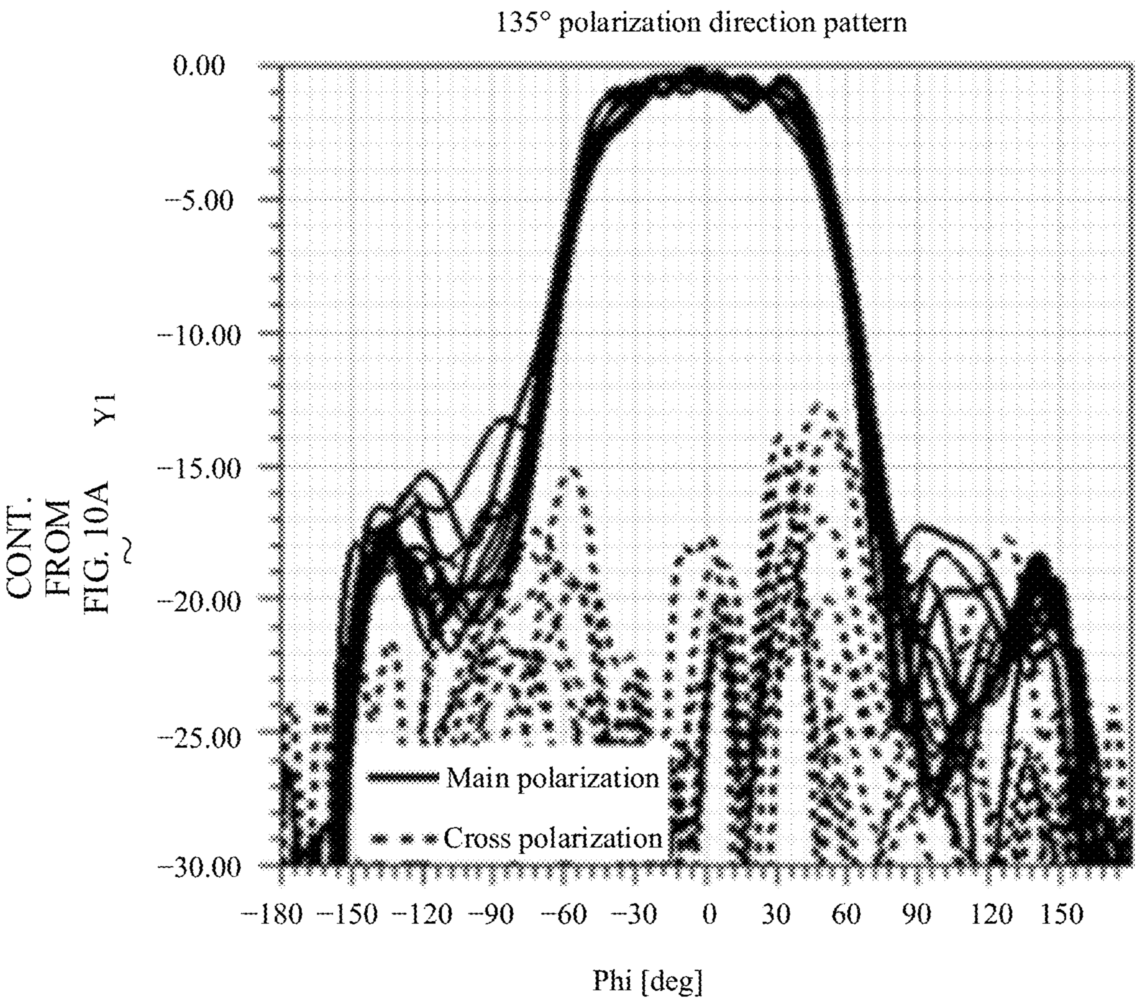
Figure 11:
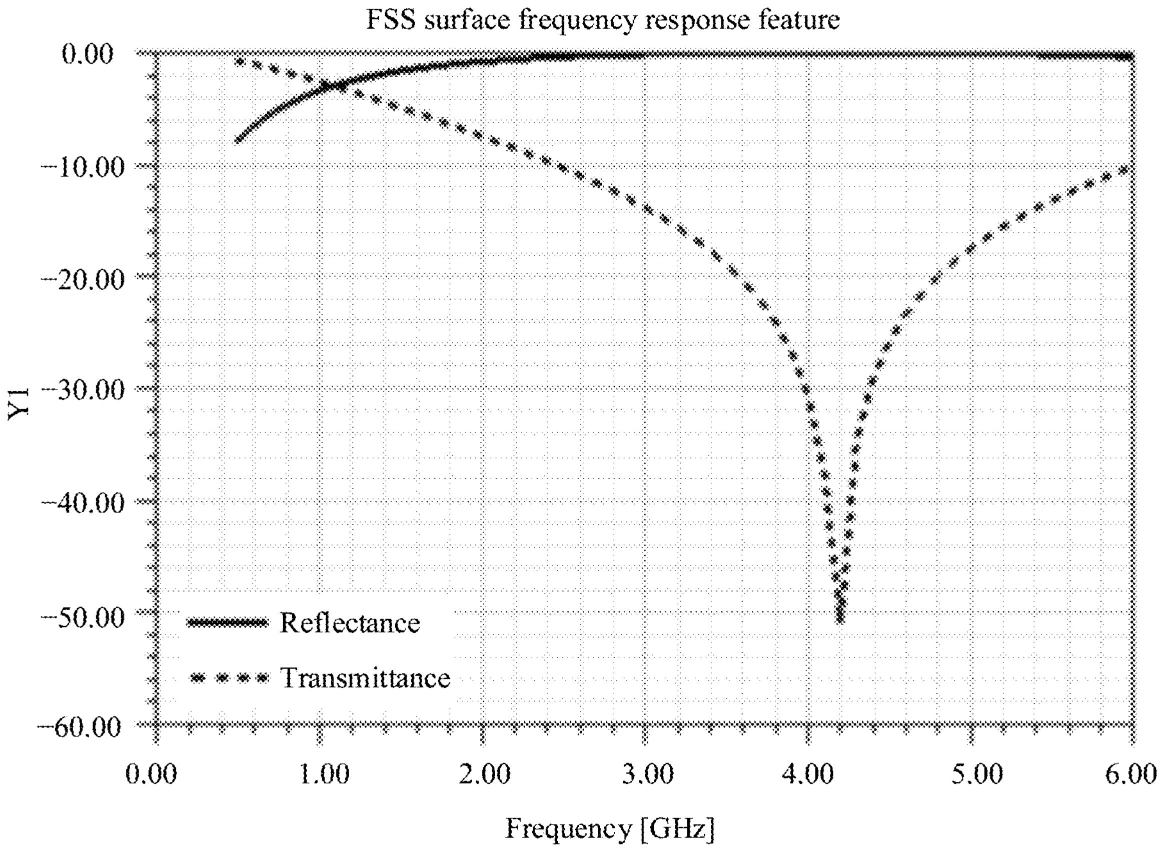
FIG. 11 is a frequency response diagram of a corresponding frequency selective panel in a common aperture antenna according to an embodiment.

To clearly explain that the loading function of the frequency selective panel 60 can reduce the height of the low frequency antenna unit 20 and implement a miniaturization design, the following provides a detailed description by using an embodiment. FIG. 10A and FIG. 10B and FIG. 11 are respectively the direction pattern of a high frequency antenna unit of a common aperture antenna and a frequency response diagram of a frequency selective panel according to one embodiment. In the embodiment, the working frequency of the high frequency antenna unit is 3.5 GHz to 4.5 GHz, and the working frequency of a low frequency antenna unit is 0.69 GHz to 0.96 GHz. As can be learned from FIG. 11, a reflection loss of the frequency selective panel is less than 0.1 dB in the frequency range of 3.5 GHz to 4.5 GHz. The effect is approximately equivalent to total reflection. The reflection loss of the frequency selective panel is approximately 4 dB in the frequency range of 0.69 GHz to 0.96 GHz, showing a partial reflection characteristic. As shown in FIG. 6, an antenna structure design corresponding to the frequency selective panel with the performance is that the distance between the low frequency antenna unit 20 and the reflection panel 10 is 36 mm, the distance between the low frequency antenna unit 20 and the frequency selective panel 60 is 10 mm, and the distance between the frequency selective panel 60 and the high frequency antenna unit 30 is 18 mm. In this case, the height of the entire common aperture antenna is 64 mm. According to a design in a conventional technology, the height of the entire common aperture antenna is determined by the height of the low frequency antenna unit. However, the height of the low frequency antenna unit working on the frequency band of 0.69 GHz to 0.96 GHz usually ranges from 70 mm to 90 mm, which is greater than 64 mm. In other words, by properly designing the frequency selective panel 60 to load the low frequency antenna unit 20, the radiation performance and the working bandwidth of the low frequency antenna unit 20 can be enhanced, and further, the distance between the low frequency antenna unit 20 and the reflection panel 10 is reduced to miniaturize the entire antenna.

Figure 8:
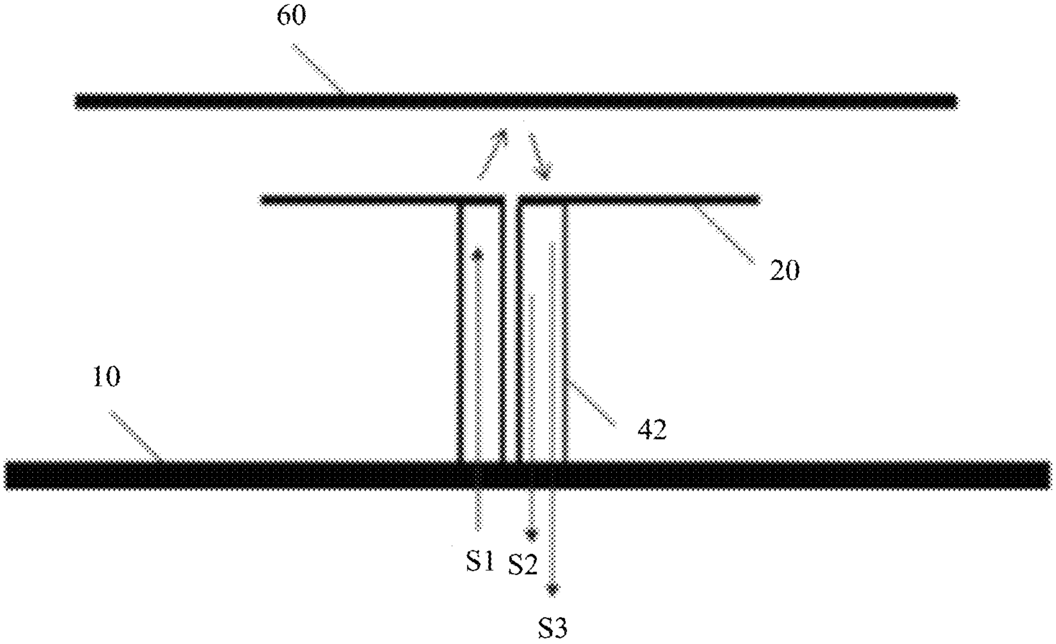
FIG. 8 is a diagram of a signal transmission path of a low frequency antenna unit of a common aperture antenna according to an embodiment.

It should be noted that a process principle of loading the low frequency antenna unit 20 by the frequency selective panel 60 is shown in FIG. 8. S1 is a signal fed to the low frequency antenna unit. A part of the signal enters the low frequency antenna unit 20, and another part of the signal is reflected by the low frequency antenna unit 20 due to impedance mismatch, to form a first reflected signal S2. After receiving a signal, the low frequency antenna unit 20 converts the received signal into a low frequency electromagnetic signal for radiation. The radiated electromagnetic signal is reflected back by the frequency selective panel 60, is received by the low frequency antenna unit 20, and is transmitted to a feeding port (which is a feeding terminal of the low frequency antenna unit 20), to form a second reflected signal S3. By properly designing and adjusting the reflectance and the reflection phase of the frequency selective panel 60 for the low frequency signal, the distance between the frequency selective panel 60 and the low frequency antenna unit 20, and a structure of the low frequency antenna unit 20, amplitudes of the second reflected signal S3 and the first reflected signal S2 (two reflected signals) can become the same, the phase difference is 180 degrees, and the two signals are counteracted with each other. In this way, reflection is reduced. The reflection reduction means that the radiation signal is enhanced, thereby enhancing the radiation performance and the working bandwidth of the low frequency antenna unit 20. After the low frequency antenna unit 20 provided in this application is adjusted, the reflected signals are counteracted with each other. In a working process, because there is no reflected signal or reflected signals are reduced, a signal radiation capability of the low frequency antenna unit 20 is improved.

In one embodiment, as shown in FIG. 6, the vacuum wavelength corresponding to the working frequency of the low frequency antenna unit 20 is λ, and the distance between the high frequency antenna unit 30 and the low frequency antenna unit 20 in the direction perpendicular to the reflection panel 10 is less than or equal to 0.5λ. On one hand, the distance between the high frequency antenna unit 30 and the low frequency antenna unit 20 in the direction perpendicular to the reflection panel 10 is set in consideration of an array antenna size design. This helps to miniaturize the antenna. On the other hand, because the antenna designed in this embodiment is applied to a wireless communication device, if the distance between the high frequency antenna unit 30 and the low frequency antenna unit 20 in the direction perpendicular to the reflection panel 10 is greater than 0.5λ, the mutual effect between the high frequency antenna unit 30 and the low frequency antenna unit 20 becomes smaller, and a decoupling effect cannot be achieved.

In one embodiment, as shown in FIG. 6 and FIG. 8, the distance between the low frequency antenna unit 20 and the frequency selective panel 60 in the direction perpendicular to the reflection panel 10 is less than or equal to 0.1λ. Herein, λ is the vacuum wavelength corresponding to the working frequency of the low frequency antenna unit 20. When the vertical distance between the low frequency antenna unit 20 and the frequency selective panel 60 is less than or equal to 0.1λ, the frequency selective panel 60 can implement a maximum of 72 degrees (0.2*360) of phase adjustment on the second reflected signal S3, adjust the vertical position of the frequency selective panel 60 and the pattern structure within the range of 0.1λ based on a simulation result, and then adjust the structure of the low frequency antenna unit 20. In this way, a good loading effect can be achieved, and a miniaturized antenna structure can be obtained.

In one embodiment, as shown in FIG. 6, the common aperture antenna 100 further includes a first feeding unit 50 and a second feeding unit 40. The reflection panel includes 10 a top surface 12 and a bottom surface 14. The low frequency antenna unit 20 is located on the side of the top surface 12 of the reflection panel 10. The first feeding unit 50 passes through the reflection panel 10 from the side of the bottom surface 14 of the reflection panel 10 and extends to electrically connect to the high frequency antenna unit 30 to feed the high frequency antenna unit 30. The second feeding unit 40 passes through the reflection panel 10 from the side of the bottom surface 14 of the reflection panel 10 and extends to electrically connect to the low frequency antenna unit 20 to feed the low frequency antenna unit 20. The low frequency antenna unit 20 and the high frequency antenna unit 30 are fixedly connected to the reflection panel 10 by using the first feeding unit 50 and the second feeding unit 40, to ensure a positional relationship between the low frequency antenna unit 20 and the high frequency antenna unit 30. In addition, the first feeding unit 50 and the second feeding unit 40 are electrically connected to the high frequency antenna unit 30 and the low frequency antenna unit 20 respectively for signal transmission. In another implementation, the first feeding unit 50 and the second feeding unit 40 may alternatively not pass through the reflection panel 10. For example, the first feeding unit 50 and the second feeding unit 40 are disposed on the side of the reflection panel 10 facing toward the low frequency antenna unit 20, and feeders of the first feeding unit 50 and the second feeding unit 40 may extend from the surface (the surface facing toward the low frequency antenna unit 20) of the reflection panel 10 to a feeding grid.

Figure 7:
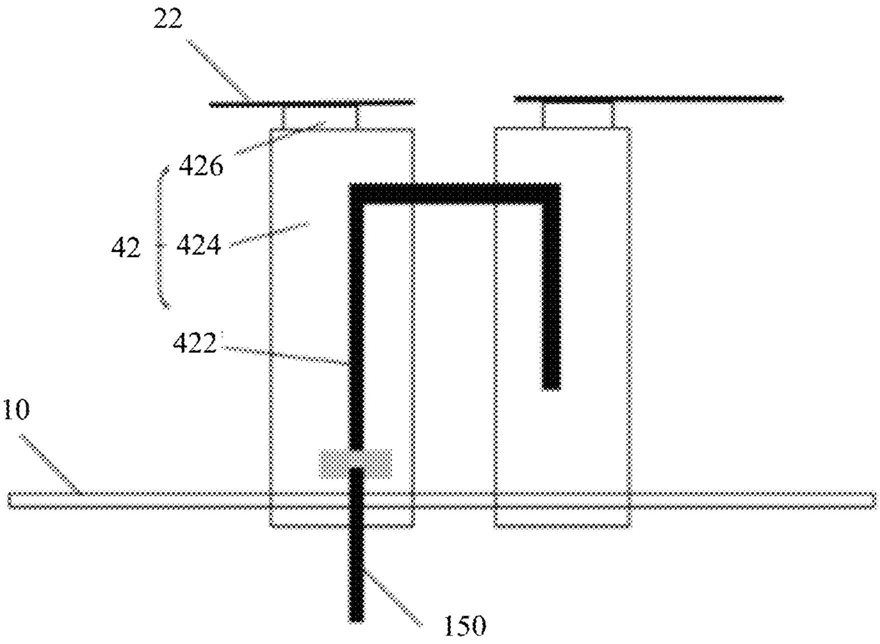
FIG. 7 is an enlarged view of the E portion of the common aperture antenna in FIG. 5.

In one embodiment, as shown in FIG. 5 to FIG. 7, the low frequency antenna unit 20 includes a first group of dipole units and a second group of dipole units, the first group of dipole units and the second group of dipole units each include two radiation arms 22, the four radiation arms are distributed in the form of a 2×2 array architecture, and the two radiation arms 22 of the first group of dipole units and the two radiation arms 22 of the second group of dipole units are respectively located at opposite corners of the array architecture. In this embodiment, the low frequency antenna unit 20 uses a bilinear polarized dipole unit, to enhance the radiation performance when being loaded on the frequency selective surface 60.

In one embodiment, as shown in FIG. 5, there are a plurality of high frequency antenna units 30, the plurality of high frequency antenna units 30 are distributed on a first plane in the form of an array, and the first plane is parallel to the frequency selective panel 60. There are a plurality of first feeding units 50, and the plurality of first feeding units 50 are in a one-to-one correspondence with high frequency antenna units 30. The low frequency antenna unit 20 includes at least one radiation arm 22. The radiation arm 22 forms a hollow-out area in the center. A part of the first feeding unit 50 passes through the hollow-out area and extends to electrically connect to the high frequency antenna unit. Specifically, in a vertical projection of each radiation arm 22 on the reflection panel 10, a projection area corresponding to the hollow-out area in the center formed the radiation arm 22 is an inner-arm area, and the first feeding unit 50 passing through the inner-arm area extends toward the low frequency antenna unit 20 and passes through the hollow-out area. Because the height of the low frequency antenna unit 20 in the direction perpendicular to the reflection panel 10 is lower than that of the high frequency antenna unit 30 and the size of the low frequency antenna unit 20 is larger than that of the high frequency antenna unit 30, to facilitate an array layout of the low frequency antenna unit 20 and the high frequency antenna unit 30, the first feeding unit 50 is disposed to pass through the hollow-out area, to reduce the distance between the low frequency antenna unit 20 and the high frequency antenna unit 30 and miniature the antenna product.

In the common aperture antenna provided in this application, in the direction perpendicular to the reflection panel 10, a part of the high frequency antenna unit 30 is disposed opposite to the low frequency antenna unit 20. A feeding apparatus, namely, the second feeding unit 40, of this part of the high frequency antenna unit 30 passes through the radiation arm 22 of the low frequency antenna unit 20 to form the hollow-out area and extends to electrically connect to the high frequency antenna unit 30. In an implementation, the second feeding unit 40 is a coaxial cable, and the coaxial cable may be perpendicular to the reflection panel 10.

As shown in FIG. 4, in one embodiment, the radiation arm 22 of the low frequency antenna unit 20 is designed as a hollow-out circular structure, so that the first feeding unit 50 of the high frequency antenna unit 30 passes through the hollow-out area of the radiation arm to connect to the high frequency antenna unit 30. Specifically, as shown in FIG. 4 and FIG. 5, in an embodiment, the first feeding unit 50 disposed on the inner-arm area passes through the circular structure to connect the high frequency antenna unit 30 and the reflection panel 10. The design of the circular structure enables the high frequency antenna unit 30 to pass through the circular structure to be fastened to the reflection panel 10, so that the high frequency antenna unit 30 and the low frequency antenna unit 20 have an overlap part in the projection interval of the reflection panel 10, that is, horizontal space of the reflection panel 10 is fully utilized.

According to a conventional technology, a low frequency antenna unit 20 and a relatively large antenna spacing (including a horizontal spacing and a vertical spacing) are used in a coaxial unit technology to prevent the low frequency antenna unit from blocking the high frequency antenna unit. However, in this technical solution, a large distance needs to be kept between high frequency antenna units to ensure that a surrounding high frequency antenna unit is not blocked. In a common aperture array antenna designed by using such a solution, the distance between the high frequency antenna units is usually 0.8 times a high frequency wavelength. As a result, the size of the array antenna is large, and the integration degree is not high enough. Furthermore, the large-angle beam scanning requirement is not met. For an array antenna with a large scanning angle, the spacing between antenna units in the array needs to be approximately 0.5 times a wavelength to avoid a large appended lobe within the scanning angle. In the common aperture antenna in this embodiment, as shown in FIG. 3 and FIG. 4, the high frequency antenna unit 30 is disposed on the side of the low frequency antenna unit 20 far away from the reflection panel 10, and the frequency selective panel 60 is disposed between the high frequency antenna unit 30 and the low frequency antenna unit 20. Such a design not only prevents the low frequency antenna unit 20 from blocking the high frequency antenna unit 30, but also reduces electromagnetic couplings between the low frequency antenna unit 20 and the high frequency antenna unit 30, so that the horizontal spacing between the low frequency antenna unit 20 and the high frequency antenna unit 30 that are located in an area outside the arm becomes smaller. Similarly, the frequency selective panel 60 is disposed between the high frequency antenna unit 30 and the low frequency antenna unit 20, and the radiation arm of the low frequency antenna unit 20 is designed as a hollow-out structure. In this way, a design of the high frequency antenna unit 30 in the inner-arm area is implemented, thereby greatly improving a miniaturized design of the antenna. In this case, large space is saved when the same signal strength is obtained.

In one embodiment, as shown in FIG. 6 to FIG. 8, the second feeding unit 40 includes: a first feeder, a second feeder, and four printed circuit boards 42 in a one-to-one correspondence with the radiation arms 22, the printed circuit boards 42 are connected between the radiation arms 22 and the reflection panel 10, each printed circuit board 42 includes a ground panel 424, a signal cable 422, and a feeding welding plate 426, two of the printed circuit boards 42 are first boards, the first boards are connected to the radiation arms 22 of the first dipole units, the other two printed circuit boards 42 are second boards, the second boards are connected to the radiation arms 22 of the second dipole units, there is a first gap between the two first boards, signal cables 422 on the two first boards are connected across the first gap, there is a second gap between the two second boards, signal cables 422 on the two second boards are connected across the second gap, each radiation arm 22 is electrically connected to the ground panel 424 through the feeding welding plate 426, an external conductor of the first feeder 150 is electrically connected to the ground panel 424 of one of the first boards, an inner conductor of the first feeder 150 is electrically connected to the signal cable 422 of the first board, an external conductor of the second feeder is electrically connected to the ground panel 424 of one of the second boards, and an inner conductor of the second feeder is electrically connected to the signal cable 422 of the second board. Specifically, as shown in FIG. 7, the first board is used as an example. One end of the signal cable 422 is connected to the inner chip of the first feeder 150, and the ground cable of the first feeder 150 is electrically connected to the ground panel 424 to transmit a signal between the first feeder 150 and the low frequency antenna unit 20. A communication signal is transmitted to the low frequency antenna unit 20 through the inner chip and the ground cable of the first feeder 150 and the printed circuit board 42, thereby transmitting a signal of the low frequency antenna unit 20.

According to the foregoing structure design, as shown in FIG. 8, a signal is transmitted to the printed circuit board 42 from the signal cable along the path S1. The transmitted signal is received by the ground panel 424, is delivered to the low frequency antenna unit 20, and is radiated under the action of the low frequency antenna unit 20. On one hand, the radiated signal is reflected back by the frequency selective panel 60 along the path S3 and enters the printed circuit board 42. On the other hand, a signal reflected by the low frequency antenna unit 20 to the printed circuit board 42 is transmitted along the path S2. According to the Balun principle, the transmission amplitudes of reflected signals on the path S2 and the path S3 are equivalent but the phase difference is 180 degrees. Therefore, the phase of the electromagnetic signal is reversed to load the low frequency antenna unit.

Figure 9:
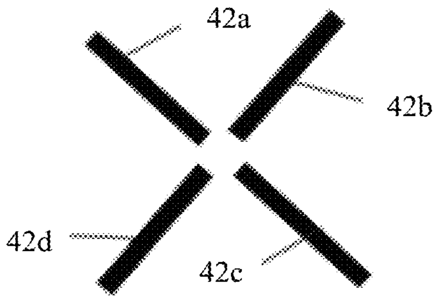
FIG. 9 is a distribution diagram of printed circuit boards of a common aperture antenna according to an embodiment.

In one embodiment, as shown in FIG. 9, two first boards are coplanar, e.g., a printed circuit board 42*a* and a printed circuit board 42*c* are coplanar; and two second boards are coplanar, e.g., a printed circuit board 42*b* and a printed circuit board 42*d* are coplanar. The direction in which the first boards extend is orthogonal to the direction in which the second boards extend. The coplanar first boards and the coplanar second boards help signal cables in the printed circuit boards stably transmit a signal to the low frequency antenna unit.

In addition, this application further provides a communication device. The communication device has a built-in signal transceiver, configured to process a signal. An interface of the signal transceiver is connected to the feeding unit of the foregoing common aperture antenna to transmit and receive a signal. The signal transceiver may transfer a current signal to the feeding unit through the interface, and a current is transmitted to the low frequency antenna unit and the high frequency antenna unit through the feeding unit. Under the action of the low frequency antenna unit and the high frequency antenna unit, a change in the current is converted into an electromagnetic signal, and the electromagnetic signal is propagated outward in a form of an electromagnetic wave. Similarly, an external electromagnetic signal is converted into a current signal by using the low frequency antenna unit and the high frequency antenna unit, is fed back to the feeding unit, and then is transferred to the signal transceiver for processing. In one embodiment, the communication device may be a radar or a base station, and the signal transceiver may be an RRU (radio remote unit). The radio remote unit may be shown in FIG. 1, may send a plurality of signals to the antenna, to implement transmission of the plurality of signals.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A common aperture antenna, comprising: a reflection panel, and a low frequency antenna unit, a frequency selective panel, and a high frequency antenna unit that are disposed on a same side of the common aperture antenna and are arranged in sequence, wherein in a direction perpendicular to the reflection panel, a distance between the high frequency antenna unit and the reflection panel is greater than a distance between the low frequency antenna unit and the reflection panel, the frequency selective panel is disposed between the high frequency antenna unit and the low frequency antenna unit, and the frequency selective panel is a reflection ground of the high frequency antenna unit and has a total reflection characteristic for a working frequency of the high frequency antenna unit;

wherein the common aperture antenna further comprises a first feeding unit that feeds the high frequency unit, and wherein the low frequency antenna unit comprises at least one radiation arm, the radiation arm forms a hollow-out area, and a part of the first feeding unit passes through the hollow-out area and extends to electrically connect to the high frequency antenna unit.

2. The common aperture antenna according to claim 1, wherein there are a plurality of high frequency antenna units, and the plurality of high frequency antenna units are distributed in a form of an array.

3. The common aperture antenna according to claim 1, wherein a transmittance of the frequency selective panel for a high frequency signal is less than or equal to 10%.

4. The common aperture antenna according to claim 1, wherein the frequency selective panel has a partial reflection characteristic for a low frequency signal.

5. The common aperture antenna according to claim 1, wherein a transmittance range of the frequency selective panel for a low frequency signal is 20% to 80%.

6. The common aperture antenna according to claim 5, wherein a vacuum wavelength corresponding to a working frequency of the low frequency antenna unit is λ, and a distance between the high frequency antenna unit and the low frequency antenna unit in the direction perpendicular to the reflection panel is not greater than 0.5λ.

7. The common aperture antenna according to claim 6, wherein a distance between the low frequency antenna unit and the frequency selective panel in the direction perpendicular to the reflection panel is not greater than 0.1λ.

8. The common aperture antenna according to claim 2, wherein the common aperture antenna further comprises a plurality of first feeding units and a second feeding unit, the plurality of first feeding units respectively feeds the plurality of high frequency antenna units, the second feeding unit feeds the low frequency antenna unit.

9. The common aperture antenna according to claim 8, wherein the high frequency antenna units are distributed in a form of an array on a first plane, and the first plane is parallel to the frequency selective panel.

10. The common aperture antenna according to claim 9, wherein the low frequency antenna unit comprises a first group of dipole units and a second group of dipole units, the first group of dipole units and the second group of dipole units each comprise two radiation arms, the four radiation arms are distributed in a form of a 2×2 array architecture, and the two radiation arms of the first group of dipole units and the two radiation arms of the second group of dipole units are respectively located at opposite corners of the array architecture.

11. The common aperture antenna according to claim 10, wherein in a vertical projection of each radiation arm on the reflection panel, a projection area corresponding to the hollow-out area formed by the radiation arm is an inner-arm area, and the first feeding unit passing through the inner-arm area extends toward the low frequency antenna unit and passes through the hollow-out area.

12. The common aperture antenna according to claim 10, wherein the second feeding unit comprises: a first feeder, a second feeder, and four printed circuit boards in a one-to-one correspondence with the radiation arms, the printed circuit boards are connected between the radiation arms and the reflection panel, each printed circuit board comprises a ground panel, a signal cable, and a feeding welding plate, two of the printed circuit boards are first boards, the first boards are connected to the radiation arms of the first dipole units, the other two printed circuit boards are second boards, the second boards are connected to the radiation arms of the second dipole units, there is a first gap between the two first boards, signal cables on the two first boards are connected across the first gap, there is a second gap between the two second boards, signal cables on the two second boards are connected across the second gap, each radiation arm is electrically connected to the ground panel through the feeding welding plate, an external conductor of the first feeder is electrically connected to the ground panel of one of the first boards, an inner conductor of the first feeder is electrically connected to the signal cable of the first board, an external conductor of the second feeder is electrically connected to the ground panel of one of the second boards, and an inner conductor of the second feeder is electrically connected to the signal cable of the second board.

13. The common aperture antenna according to claim 12, wherein the two first boards are coplanar, the two second boards are coplanar, and a direction in which the two first boards extend is orthogonal to a direction in which the two second boards extend.

14. A communication device, comprising a signal transceiver, and further comprising a common aperture antenna, wherein the common aperture antenna is connected to the signal transceiver through a plurality of radio signal transceiver channels, and wherein the common aperture antenna comprises: a reflection panel, and a low frequency antenna unit, a frequency selective panel, and a high frequency antenna unit that are disposed on a same side of the common aperture antenna and are arranged in sequence, wherein in a direction perpendicular to the reflection panel, a distance between the high frequency antenna unit and the reflection panel is greater than a distance between the low frequency antenna unit and the reflection panel, the frequency selective panel is disposed between the high frequency antenna unit and the low frequency antenna unit, and the frequency selective panel is a reflection ground of the high frequency antenna unit and has a total reflection characteristic for a working frequency of the high frequency antenna unit;

wherein the common aperture antenna further comprises a first feeding unit that feeds the high frequency unit, and wherein the low frequency antenna unit comprises at least one radiation arm, the radiation arm forms a hollow-out area, and a part of the first feeding unit passes through the hollow-out area and extends to electrically connect to the high frequency antenna unit.

15. The communication device according to claim 14, wherein there are a plurality of high frequency antenna units, and the plurality of high frequency antenna units are distributed in a form of an array.

16. The communication device according to claim 14, wherein a transmittance of the frequency selective panel for a high frequency signal is less than or equal to 10%.

17. The communication device according to claim 14, wherein the frequency selective panel has a partial reflection characteristic for a low frequency signal.

18. The communication device according to claim 14, wherein a transmittance range of the frequency selective panel for a low frequency signal is 20% to 80%.

19. The communication device according to claim 18, wherein a vacuum wavelength corresponding to a working frequency of the low frequency antenna unit is λ, and a distance between the high frequency antenna unit and the low frequency antenna unit in the direction perpendicular to the reflection panel is not greater than 0.5λ.

20. The communication device according to claim 19, wherein a distance between the low frequency antenna unit and the frequency selective panel in the direction perpendicular to the reflection panel is not greater than 0.1λ.

* * * * *